Dec. 8, 1959   F. M. RYCK   2,915,771
WINDSHIELD WIPER TRANSMISSION AND ARM ASSEMBLY
Filed Sept. 16, 1957

INVENTOR.
Francis M. Ryck
BY
M. H. Strickland
His Attorney

United States Patent Office 2,915,771
Patented Dec. 8, 1959

2,915,771

WINDSHIELD WIPER TRANSMISSION AND ARM ASSEMBLY

Francis M. Ryck, Rochester, N.Y., assignor to General Motors Corporation, Detroit, Mich., a corporation of Delaware Application September 16, 1957, Serial No. 684,034

6 Claims. (Cl. 15—255)

This invention pertains to windshield wipers, and particularly to an improved windshield wiper transmission and arm assembly.

It is well recognized that an angle of more than 90° oscillation cannot be obtained from a simple rotary crank. Thus, if a wiper blade and arm are to be oscillated throughout an angle of more than 90° from a rotary crank by means of a link type drive, any attempt to enlarge the wiper arc in the linkage causes the pivot shaft cranks to travel through an arc which causes a loss of power when the driving crank is driven through the dead center angle, or position. Accordingly, in order to manufacture a workable system wherein the wiper arc is greater than 90° with a simple rotary crank, it is necessary to incorporate some type of angle multiplying mechanism between the rotary crank and the wiper arm. The present invention relates to an improved transmission and arm assembly including means for multiplying the angle throughout which the wiper arm is oscillated with respect to the angle through which the pivot shaft is oscillated. Accordingly, among my objects are the provision of a wiper transmission and arm assembly including means for amplifying the angular movement imparted to the arm; the further provision of a wiper transmission and arm assembly including an angle multiplying gear train; and the still further provision of a multi-part wiper arm assembly wherein the angular movement imparted to the blade carrying section of the wiper arm is greater than the angular movement imparted to the pivot shaft.

The aforementioned and other objects are accomplished in the present invention by incorporating an angle multiplying gear train in the wiper transmission and arm assembly. Specifically, the wiper arm assembly is designed for attachment to a pivot shaft which is rotatably journalled in a stationary housing. The pivot shaft has a serrated drive head, or burr, adapted to telescopically receive the socket section of a wiper arm.

The wiper arm assembly includes an intermediate section and an outer blade carrying section in addition to the socket section. The pivot shaft housing has a toothed outer periphery constituting a fixed ring gear. The socket section carries a stub shaft for pivotally supporting the intermediate arm section having an integral gear segment thereon which meshes with the ring gear on the pivot shaft housing. The intermediate arm section has a loose journal bearing connection with the stub shaft of the socket section, and is normally spring biased into engagement with the stationary ring gear. The loose journal bearing construction permits assembly and disassembly of the arm assembly from the pivot shaft. The intermediate arm section is pivotally connected to the outer arm section about an axis transverse to the longitudinal axis of the arm, which is urged towards the windshield by a spring, opposite ends of which are connected to the outer arm section and the intermediate arm section.

The ratio of the pitch diameter of the gear segment and the stationary ring gear may be on the order of two to one, so that for a 90° oscillation of the pivot shaft, the intermediate and outer arm sections will oscillate throughout an angle of 135°. Accordingly, upon oscillation of the pivot shaft, the socket section will be oscillated through an angular distance of 90°, and in so doing will oscillate the stub shaft carrying the intermediate wiper arm section. This will cause the intermediate gear segment to move about the stationary ring gear so that the intermediate and outer arm sections will oscillate in the same direction throughout a greater angle dependent upon the ratio of pitch diameters between the gear segment and the stationary ring gear.

Further objects and advantages of the present invention will be apparent from the following description, reference being had to the accompanying drawing, wherein a preferred embodiment of the present invention is clearly shown.

Figure 1:
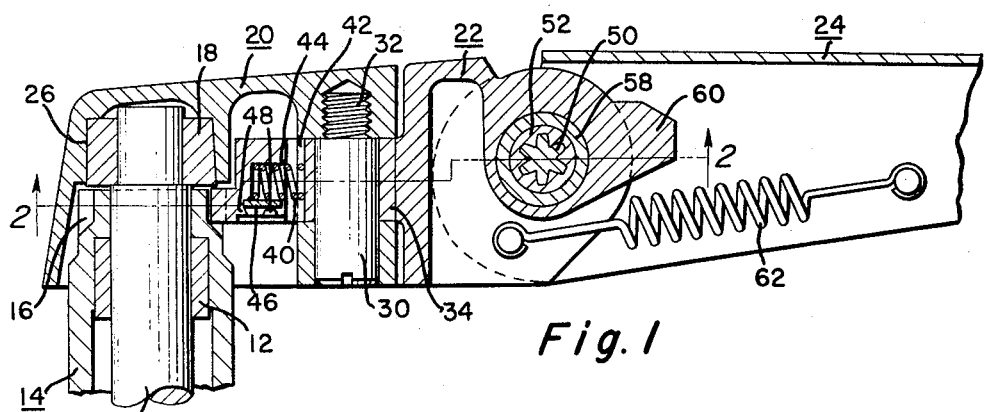
Figure 1 is a fragmentary longitudinal sectional view of a wiper arm and transmission assembly constructed according to this invention.
Figure 2:
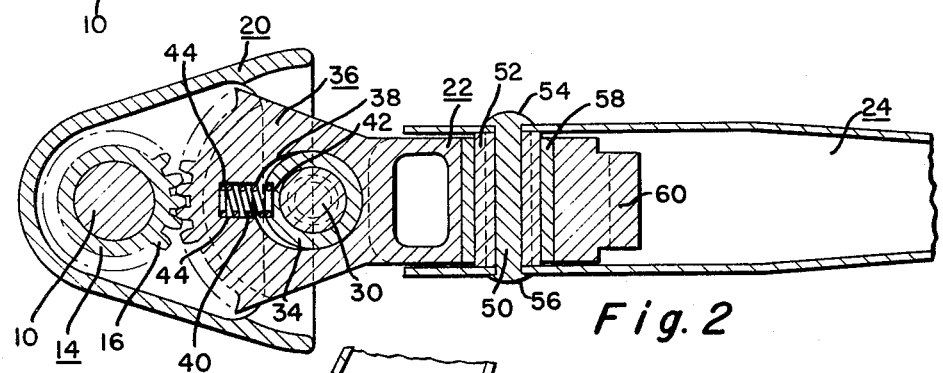
Figure 2 is a sectional view taken along line 2—2 of Figure 1.

With particular reference to Figures 1 and 2, the improved wiper transmission and arm assembly includes an oscillatory drive shaft 10 which is rotatably mounted in a fixed bearing 12 supported in a housing 14 attached to a vehicle, not shown. The housing 14 has a toothed outer periphery as indicated by numeral 16 which constitutes a fixed ring gear. In addition, the shaft 10 has a serrated burr, or drive head, 18 of conventional construction rigidly attached thereto.

Figures 3, 4:
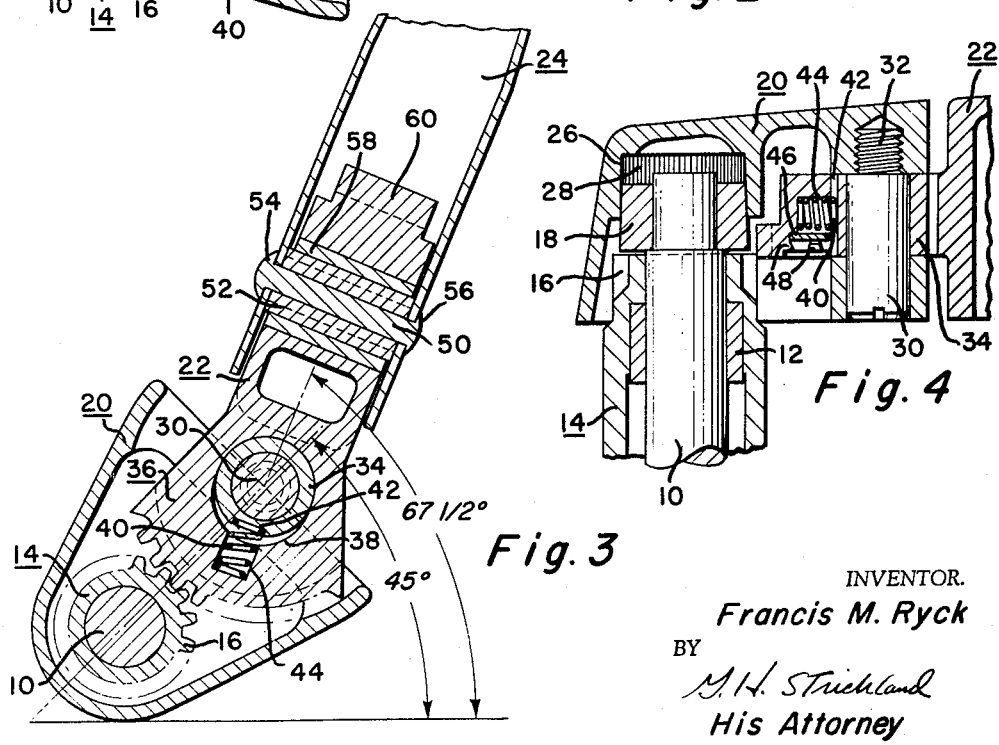
Figure 3 is a fragmentary sectional view indicating the mode of operation.
Figure 4 is a fragmentary sectional view indicating the manner in which the arm assembly can be assembled and disassembled from the pivot shaft.

The improved wiper arm assembly, or wiper arm unit, of this invention includes a shaft mounting section 20, an intermediate section 22 and a blade carrying section 24. The blade carrying section is designed for connection at its outer end with any suitable type wiper blade, not shown. The shaft mounting section 20 includes a socket portion designated generally by the numeral 26 having complementary internal serrations 28 as shown in Figure 4 whereby the shaft mounted section 20 can be nonrotatably secured to the burr 18 so as to oscillate therewith. In addition, the shaft mounting section 20 carries a stub shaft 30 which is threaded thereinto as indicated by numeral 32. A portion of the stub shaft 30 is encircled by a bushing 34.

The intermediate, or arm mounting section 22 is formed with integral gear segment 36, as shown in Figure 2, having an elongated aperture 38 therethrough through which the stub shaft 30 and the bushing 34 extend. The axis of the stub shaft 30 is parallel to but spaced from the axis of shaft 10. The gear segment 36 is normally maintained in toothed engagement with the fixed gear 16 by yieldable means comprising a spring 40, one end of which is seated in a groove 42 in the bushing 34, and the other end of which is seated in a slot 44 in the gear segment 36. The spring 40 is retained in the slot 44 by a retainer plate 46 which is staked in place as indicated by numeral 48.

The pitch diameter of the gear segment 36 in the disclosed embodiment is twice the pitch diameter of the stationary ring gear 16. However, it is to be understood that this gear ratio is only exemplary and is not to be construed as a limitation. The drive arrangement between the intermediate section 22 and the shaft mounting section 20 is such that a predetermined angular movement of the shaft 10 and the shaft mounting section 20 will result in a proportionally greater angular movement of the intermediate section 22. More particularly, with a two to one gear ratio as aforedescribed and with reference to Figure 3, a 45° movement of the shaft 10 about its axis will result in angular movement of the intermediate section 22 about the stub shaft 30 throughout an angle of 67.5°.

The outer arm section 24 is of channel configuration, and is spring hinged to the intermediate section 22. The hinge comprises a pinion member 50 disposed within a molded or broached bushing 52. The pinion 50 includes headed portions 54 and 56 as shown in Figure 2 for attaching the same to the outer wiper arm section 24. The bushing 52 is rotatably journalled within bushing 58 carried by an extension 60 of the intermediate arm section 22. The outer arm section 24 is urged toward the windshield of a vehicle relative to the intermediate section 22 by means of a coil spring 62, one end of which is secured to the section 22, and the other end to the section 24.

In order to remove the wiper arm unit from the drive burr 18, it is only necessary to pull the outer arm section radially outward to the position of Figure 4 wherein the spring 40 is compressed and the gear segment 36 is disengaged from the stationary gear 16. When the parts are in the position of Figure 4 the arm assembly can be disengaged from the drive burr 18 or reengaged therewith, and upon release of the outer arm section the driving connection between the gear segment and the stationary gear will be automatically attained. The gear segment 36 is disposed beneath a portion of the burr 18 and thus also constitutes a latch.

From the foregoing it is readily apparent that the present invention provides unique wiper transmission and arm assembly wherein the angular movement of the blade carrying section is greater than the angular movement of the shaft mounting section. In addition, the present invention provides a wiper blade assembly which can be readily assembled and disassembled with a drive shaft and incorporates a unique hinge spring connection between the outer and intermediate blade sections.

While the embodiment of the invention as herein disclosed constitutes a preferred form, it is to be understood that other forms might be adopted.

What is claimed is as follows:

1. A windshield cleaner for a vehicle, including, a bearing on said vehicle and an oscillatory drive shaft rotatably mounted in said bearing to rock about a fixed axis, a wiper arm unit supported on said drive shaft including a shaft mounting section nonrotatably secured to said drive shaft, an arm mounting section rotatably supported on said shaft mounting section and a wiper carrying section supported on the arm mounting section, means for multiplying the angular movement of said arm mounting section with respect to the movement of said shaft mounting section including coengaging gear elements, and yieldable means normally holding the gear elements in engagement while yielding to permit their disengagement.

2. A wiper arm and transmission assembly including, a shaft journalled for rotation by a bearing, a housing supporting said bearing and having a stationary ring gear, a wiper arm unit including a shaft mounting section nonrotatably secured to said shaft, and an arm mounting section pivotally connecting to said shaft mounting section on an axis spaced from but parallel to the axis of said shaft, and a blade carrying section supported by said arm mounting section, said arm mounting section having gear means engageable with said stationary gear for providing removal of said arm unit from said shaft, and yieldable means disposed between said shaft mounting section and said arm mounting section for permitting disengagement of the wiper arm unit from said shaft.

3. A windshield cleaner for a vehicle, including, a bearing on said vehicle, an oscillatory drive shaft rotatably mounted in said bearing to rock about a fixed axis, said bearing being carried by a stationary housing having stationary gear means, a wiper arm unit supported on said shaft including a shaft mounting section nonrotatably secured to said shaft, an arm mounting section having a loose journal bearing connection with said shaft mounting section so as to be movable relative thereto, said arm mounting section being supported for movement about an axis spaced from but parallel to said fixed axis and including a gear segment engageable with said stationary gear means, said gear segment having a greater pitch diameter than said stationary gear means, resilient means acting between said loose journal bearing and said arm mounting section for maintaining said gear segment in toothed engagement with said stationary gear means, and a wiper carrying section spring hinged to said arm mounting section whereby a predetermined angular movement of said drive shaft will effect a greater angular movement of said wiper carrying section.

4. A windshield cleaner for a vehicle, including, a bearing on said vehicle, an oscillatory drive shaft rotatably mounted in said bearing to rock about a fixed axis, said bearing being carried by a stationary housing having stationary gear means, a wiper arm unit supported on said shaft including a shaft mounting section nonrotatably secured to said shaft, an arm mounting section pivotally connected to said shaft mounting section so as to be movable relative thereto, said arm mounting section being pivotally supported for movement about an axis spaced from but parallel to said fixed axis and including a gear segment engageable with said stationary gear means, said gear segment having a greater pitch diameter than said stationary gear means, said arm mounting section being bodily movable toward and away from said stationary housing to disengage or engage said gear segment and said stationary gear means, and a wiper carrying section spring hinged to said arm mounting section whereby a predetermined angular movement of said drive shaft will effect a greater angular movement of said wiper carrying section.

5. In a windshield cleaner for oscillating a wiper blade across the surface of a windshield including, an oscillatory shaft, an arm assembly having blade carrying means pivoted on an axis transverse to the arm assembly and substantially parallel to the axis of said shaft and movement multiplying gear means operable automatically upon angular movement of said arm assembly by said shaft for increasing the angular movement imparted to said blade carrying means with respect to the angular movement of said shaft, said movement multiplying gear means including stationary and rotatable gear elements and yieldable means normally holding said gear elements in engaged relationship while yielding to permit disengagement therebetween.

6. The combination set forth in claim 5 wherein said shaft is journalled in a fixed bearing, wherein said stationary gear element supports said bearing and wherein said movable gear element is carried by said arm assembly.

References Cited in the file of this patent

UNITED STATES PATENTS

| | | |
|---|---|---|
| 1,035,324 | Dalfond | Aug. 13, 1912 |
| 2,022,885 | Hueber | Dec. 3, 1935 |
| 2,184,700 | Horton | Dec. 26, 1939 |
| 2,200,440 | Atwood | May 14, 1940 |
| 2,516,808 | Seger | July 25, 1950 |
| 2,685,483 | Morra | Aug. 3, 1954 |
| 2,799,039 | Oishei | July 16, 1957 |